Patented Sept. 29, 1931

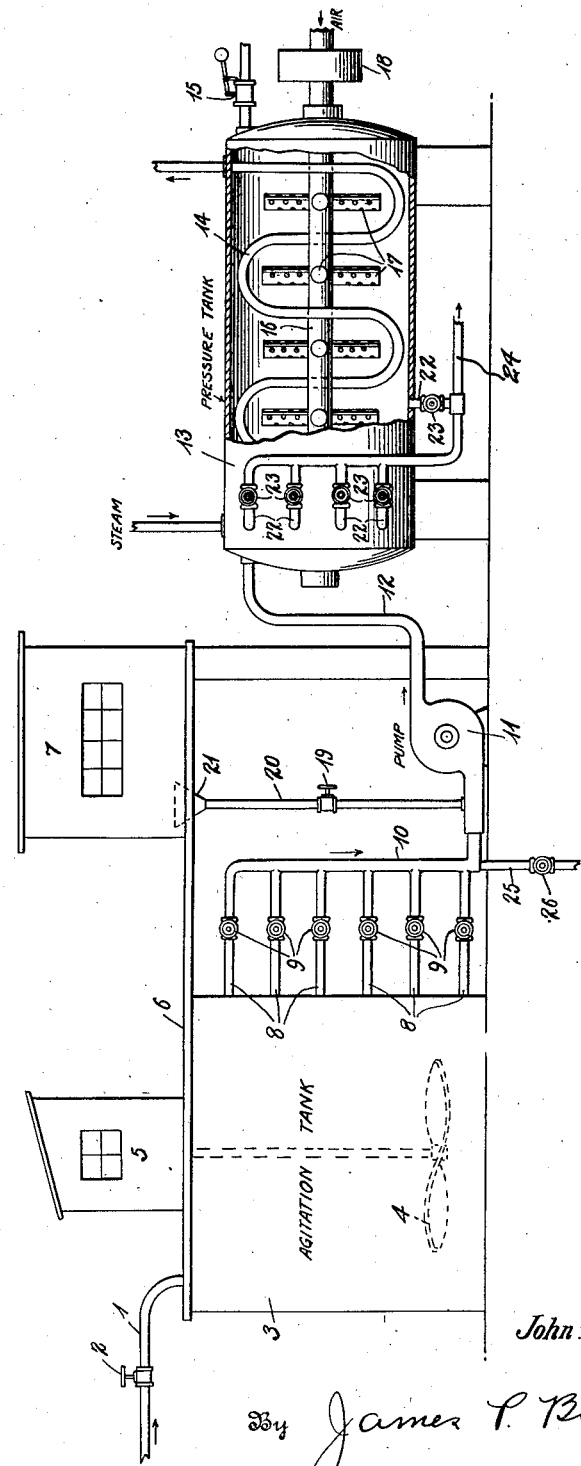

1,824,936

UNITED STATES PATENT OFFICE

JOHN T. TRAVERS, OF COLUMBUS, OHIO, ASSIGNOR, BY DIRECT AND MESNE ASSIGNMENTS, TO THE OHIO SANITARY ENGINEERING CORPORATION, OF COLUMBUS, OHIO, A CORPORATION OF OHIO

PROCESS FOR PURIFYING INDUSTRIAL WASTE LIQUORS

Application filed June 30, 1928. Serial No. 289,635.

This invention relates to a process for purifying industrial waste liquors and has more particular reference to the treatment of industrial waste liquors having an acid reaction of the character of spent pickle liquors from steel mills and the like.

The waste liquors from steel mills are characterized by the fact that they contain substantial quantities of free acid, usually sulphuric acid, and also substantial quantities of iron salts, generally in the form of ferrous sulphate. The process forming the subject matter of the present invention is especially adapted to the treatment of spent sulphuric acid pickle liquors. The acid content may vary between relatively wide limits, as for example, from around 1% to 15%. The iron salts may also vary between substantially the same limits, i. e., from 1% to 15%.

Many processes have heretofore been devised and numerous patents issued for processes designed and intended to be employed for the purification of waste pickle liquors. These processes generally contemplate the neutralization of the acid by an alkali and the effecting of the removal of some of the iron salts from the liquor. While some of the processes of the prior art have met with a measurable degree of success, there has not been, to my knowledge, any process ever heretofore developed which will eliminate from waste sulphuric acid pickle liquors their entire content of iron salts, except by the use of reagents or operations, the expense of which render the cost of such processes prohibitive for commercial use.

It is a specific object of this invention to provide an economic process which may be carried out without necessitating the use of expensive reagents or operations and without requiring the attention of highly skilled workmen, and which will effect a complete removal from the waste pickle liquor of its entire acid and iron content.

The detailed features of the process may be varied somewhat, but in the main they are predicated upon an appreciation of the fact that the ferrous sulphate content of the waste pickle liquor will hydrolyze only when the liquor has a hydrogen ion concentration between the pH value 6 and the pH value 7. We have definitely determined that the hydrolysis of the ferrous sulphate in water commences at pH 6 and increases with an increase in pH reaching a maximum at pH 7. The degree of hydrolysis is proportional to the pH within these limits. It will be understood, of course, that the rate at which the hydrolysis of the ferrous sulphate occurs, will be dependent upon the rate of removal of the products of the hydrolysis of the ferrous sulphate, which products are ferrous hydroxide and sulphuric acid. This process contemplates the neutralizing and consequent elimination of the acid as rapidly as it is formed and further contemplates the removal of the ferrous hydroxide by oxidation thereof. Since the hydrolysis of the ferrous sulphate can only occur when the pickle liquor has a hydrogen ion concentration ranging between the pH value 6 and the pH value 7, it is essential to the process that a reagent be employed which will maintain this necessary hydrogen ion concentration in the liquor.

As an important feature of the process, I employ a reagent which will be adequate to maintain the hydrogen ion concentration of the liquor at a pH value approximately that of the upper limit above given, i. e., pH 7, when used in slight excess, and which will not raise the hydrogen ion concentration of the liquor above the value pH 7 regardless of the excess quantity introduced. Suitable reagents for maintaining the hydrogen ion concentration within the desired limits are the carbonates of the alkaline earth metals.

The description herein, for the purposes of simplicity and clearness, will relate only to the employment of one of these reagents, namely, calcium carbonate, preferably in the form of marl.

When calcium carbonate in the form of marl is employed, I preferably use marl 80% of which will pass through a 60 mesh screen and be retained upon a 100 mesh screen.

Since the waste pickle liquor has a free acid content, and further since the desired hydrolysis of the ferrous sulphate cannot be effected until the hydrogen ion concentration has been raised to above pH value 6, the preliminary step of the process comprises the initial incorporation in the waste pickle liquor of a quantity of the reagent adequate to neutralize the free acid content of the waste pickle liquor and raise the pH value to approximately the upper limit of the hydrolysis range. It will be appreciated that the quantity of the reagent necessary to effect this increase in the hydrogen ion concentration will vary, dependent upon the free acid content of the waste pickle liquor and also dependent upon the neutralizing value of the specific reagent employed. I have furthermore discovered that a quantity of the reagent which would be theoretically adequate, based upon calculation of the free acid content of the waste pickle liquor and the neutralizing value of the reagent, is not sufficient to raise the pH to the desired degree, namely, approximately pH 7. I, therefore, find it necessary to employ an excess of the reagent to bring about the desired elevation in the pH of the waste pickle liquor.

In actual operations, I have found it desirable to employ the reagent in sufficient excess to give from 15 to 20% more neutralizing value than theoretically required.

As hereinbefore set forth, the purpose of employing the reagent in this excess is to neutralize the free acid and raise the pH of the pickle liquor to approximately the upper limit of the hydrolysis range. It is to be particularly understood, however, that the mere incorporation of the reagent in such excess does not, in and of itself, bring about this result. The free acid content of the waste pickle liquor is substantially completely neutralized immediately upon the incorporation therein of the reagent. However, I have found it necessary, in order to raise the pH to a pH value approximately that of the upper limit of the hydrolysis range, i. e., pH 7, to subject the pickle liquor having incorporated therein the reagent in excess, to a time period of agitation. The purpose and necessity for the time period of agitation are as follows:

(a) To liberate from the solution the carbon dioxide released by decomposition of the carbonic acid which is present in the solution as a product of the neutralization of the sulphuric acid; to lower the H ion concentration due to the dissociation of the carbonic acid in the solution.

(b) To permit and accelerate the hydrolysis of the carbonate of the alkaline earth metal in the solution, thus releasing hydroxyl ions which neutralize the effect of a portion of the hydrogen ions released in the solution as a result of the hydrolysis of the ferrous sulphate.

The second phenomenon above enumerated has a further significance in the process, inasmuch as the hydrolysis of the calcium carbonate occurs at a much slower rate than does the hydrolysis of the ferrous sulphate. For this reason and for the further reason that $FeSO_4$, hydrolyzes more strongly than do the carbonates of the alkaline earth metals, there is never available in the solution sufficient hydroxyl ions to completely counteract the effect of the hydrogen ions resulting from the hydrolysis of the ferrous sulphate and consequently the hydrogen ion concentration of the solution never reaches a pH value above 7. The time period of agitation should be adequate to effect maximum hydrolysis of the carbonate of the alkaline earth metal employed as the reagent. In actual practice it has been found that a time period of from one and one-half to two hours of constant agitation is required to effect the maximum hydrolysis of calcium carbonate and establish a state of equilibrium.

The procedure hereinbefore outlined effects a condition in the waste pickle liquor favorable to the hydrolysis of the ferrous sulphate, substantially 90% of the original content of which is still present in the liquor at this stage of the process.

In actual practice, I have found that when the maximum hydrolysis of the calcium carbonate has been effected and a state of equilibrium established, the hydrogen ion concentration of the solution will be approximately pH 6.8, which, it will be recognized, closely approximates the maximum limit for the hydrolysis range hereinbefore described. Ferrous sulphate hydrolyzes in accordance with the following reaction:

$$FeSo_4 + 2H_2O = Fe(OH)_2 + H_2SO_4$$

This is a reversible reaction and continued hydrolysis of the ferrous sulphate is dependent upon the removal of the products of hydrolysis. To effect a complete hydrolysis of the ferrous sulphate I provide for the neutralization of the sulphuric acid product of the hydrolysis as fast as formed, by the incorporation in the solution of an adequate supply of the same reagent which was employed to increase the pH of the waste pickle liquor and remove the ferrous hydroxide resulting from the hydrolysis of the ferrous sulphate by oxidizing the ferrous hydroxide to ferric hydroxide which is insoluble and precipitates from the solution. Since my process provides for the continuous removal from the solution of the products of the hydrolysis of the ferrous sulphate, it will be at once apparent that the hydrolysis of the ferrous sulphate will likewise be continuous until complete.

To effect a continuous neutralization of the sulphuric acid produced by the hydrolysis of the ferrous sulphate, it will be appreciated that the carbonate of the alkaline earth metal employed as the reagent will be incorporated in the pickle liquor in sufficient excess to completely neutralize the entire bound acid content of the ferrous sulphate. The quantity of reagent in this stage of the process will, therefore, vary, dependent on the quantity of the ferrous sulphate present in the pickle liquor and also dependent upon the neutralizing value of the particular reagent employed. For example, if a pickle liquor be treated which has a 10% content of ferrous sulphate and a reagent employed having a neutralizing value such that 100 units of the reagent will neutralize 90 units of acid, approximately 666 pounds of the reagent will be required to treat 1000 gallons of the pickle liquor in this phase of the process. It is, of course, desirable to employ the reagent in slight excess.

The oxidation of the ferrous hydroxide to ferric hydroxide is accomplished in the process by the employment of atmospheric oxygen, preferably in the form of diffused air.

An important feature of the process resides in the discovery of a method for effecting continuous and complete oxidation of the ferrous hydroxide. When an attempt is made to continuously oxidize ferrous hydroxide resulting from the hydrolysis of ferrous sulphate at room temperature, it is found that the oxidation proceeds fairly rapidly for a short period. I have ascertained that in the oxidation process and during the period of transition from the ferrous to the ferric state, that a colloidal condition is reached when this material is neither in solution or suspension, but in a state of dispersion.

As a result of this colloidal condition there is formed a colloidal complex composed of ferrous hydroxide and ferric hydroxide in varying proportions. This colloidal complex creates a protective action by enveloping the ferrous hydroxide molecules, preventing intimate contact between the oxidizing agent and the ferrous hydroxide molecules, thus substantially preventing further oxidation of the ferrous hydroxide. I have furthermore ascertained that the stability of such colloidal complex may be destroyed by the application of temperatures of the order of 100° C. Based upon these discoveries, I effect the oxidation of the ferrous hydroxide to ferric hydroxide by bubbling atmospheric oxygen through the waste pickle liquor while the same is maintained at an elevated temperature approximating 100° C. or above. It is also to be noted that the elevated temperature not only functions to destroy the stability of the colloidal complex, but also accelerates the rate of oxidation of the ferrous hydroxide, which, in turn, accelerates the rate of hydrolysis of the ferrous sulphate. Since the rate of hydrolysis of the ferrous sulphate is dependent upon the rate of removal of the products of such hydrolysis, it will be appreciated that the time period necessary to effect complete hydrolysis of the ferrous sulphate is dependent upon the time period required to oxidize the ferrous hydroxide to ferric hydroxide, since, of course, the neutralization of the sulphuric acid product of the hydrolysis occurs simultaneously with its formation.

By the process I am able to effect a more or less rapid oxidation of the ferrous hydroxide and resultant hydrolysis of the ferrous sulphate. The oxidation of the ferrous hydroxide when effected at elevated temperatures as above described, may be greatly accelerated by carrying out the oxidation under superatmospheric pressure preferably of the order of from two to four atmospheres. I have found that the rate of oxidation is substantially proportional to the pressure employed. A further advantage flowing from the employment of superatmospheric pressure resides in the fact that somewhat higher temperatures may prevail when superatmospheric pressure is employed. As the velocity of molecular oxygen is proportional to the temperature, it will be seen that the activity of the oxygen will be greatly increased. The concentration of the oxygen in the solution will furthermore be greatly increased when superatmospheric pressure conditions prevail. In actual practice I have found that when the oxidation of the ferrous hydroxide is effected at temperatures of the order of 100° C., under atmospheric pressure, a period of approximately one hour is required to effect complete oxidation of the ferrous hydroxide and resultant complete hydrolysis of the ferrous sulphate, when treating a pickle liquor having a 10% content of ferrous sulphate. The time period can be accurately controlled in accordance with the process, by regulating the pressure conditions under which the oxidation of the ferrous hydroxide to ferric hydroxide is effected as, for example, when effected under a pressure of two atmospheres the time period is reduced to approximately 20 minutes.

The effluent produced by the foregoing operations is completely free from the contaminating constituents present in the raw pickle liquor, but it will be appreciated that it contains some calcium sulphate in solution, commonly contributing to the premanent hardness of water. The effluent may be softened if found desirable by suitable treatment with soda ash.

While it is possible to carry out the complete process in one continuous operating phase, I have found it preferable to divide the operation into two stages, the first stage comprising the neutralizing of the free acid content of the waste and the elevation of pH to that attained by the maximum hydrolysis of the carbonate of the alkaline earthmetal employed, followed by a separation of the resulting sludge: and the second stage comprising the continuous hydrolysis of the ferrous sulphate by maintaining in the pickle liquor sufficient reagent to completely neutralize the acid product of hydrolysis as formed, and the oxidization of the ferrous hydroxide to ferric hydroxide at elevated temperatures, with or without the employment of super-atmospheric pressure, followed by the removal of the sludge resulting from the second stage of the treatment.

An apparatus suitable for carrying out the process of the invention, is diagrammatically shown in the accompanying drawing wherein a conduit (1) controlled by valve (2) conveys the pickle liquor to the agitating tank (3) equipped with a suitable agitator (4) driven by mechanism enclosed in the shelter (5). Above tank (3) is provided a runway (6) leading to a chemical storage room (7). The first stage of the process is effected in tank (3). When the hydrolysis of the $CaCO_3$ reaches the state of equilibrium, the effluent liquor is withdrawn from tank at a selected level through lines (8) controlled by valves (9). This effluent liquor is passed through line (10) to pump (11) and forced through line (12) into the pressure chamber (13). A steam coil (14) is provided for heating the liquor in chamber (13) to the desired temperature of 100 degrees centigrade or above. A pressure release valve (15) set at the working pressure, may be provided on the chamber (13). Air, for oxidizing the ferrous hydroxide, may be introduced through the centrally disposed tubular member (16) journaled in the ends of chamber (13). The tubular member (16) carries radial perforated arms (17) for admitting the diffused air into the liquor. The member (16) can be rotated if desired by suitable application of power to the belt wheel (18). It will be understood that the air will be supplied to the member (16) under a greater pressure than that prevailing in the chamber (13).

From the above it will be apparent that the liquor in chamber (13) may be simultaneously heated and the ferrous hydroxide oxidized. To effect the neutralization of the $H_2SO_4$ as formed, the neutralizing agent may be admitted in controlled quantities with additional effluent from tank (3) by suitable control of the valve (19) in the line 20, which connects the hopper (21) with the suction side of pump (11). Vertically spaced drawoff lines (22) controlled by valves (23) communicate with the chamber (13) and terminate in a common header (24).

The sludge which collects in tank (3) may be removed through the lower drawoff line 8 and lead to a suitable sludge bed filter or the like through line (25) controlled by valve (26). While the sludge from tank (13) may be removed through the lowermost drawoff line (22) and may be, if desired, combined with the sludge from tank (3) through suitable means (not shown.)

In the treatment of a normal spent pickle liquor (having a 3% $H_2SO_4$ content and a 10% $FeSO_4$ content), I have found that approximately 1000 pounds of reagent will be adequate for the treatment of 1000 gallons of spent pickle liquor and that the combined sludges resulting from stage 1 and stage 2 of the treatment will be approximately 1700 pounds.

The combined sludge obtained as a result of the treatment of the waste pickle liquor in accordance with the process, contains a very substantial content of precipitated calcium sulphate formed by the various reactions in the process. Because of this content of precipitated calcium sulphate, the sludge constitutes a most excellent electrolyte and is especially well adapted for the treatment of organic waste liquors containing putrescible matter in colloidal form in accordance with the process described in United States Patene No. 1,672,587, issued June 5, 1928.

A representative analysis of the sludge produced by the process is as follows:—

| | Per cent |
|---|---|
| Ferrous hydroxide | 2.18 |
| Ferric hydroxide | 13.65 |
| Calcium sulphate | 69.22 |
| Calcium carbonate | 14.90 |

From the foregoing description it will be evident that I have provided a process for the complete purification of spent sulphuric acid pickle liquors which can be effected by the employment of a reagent which can be obtained at exceptionally low cost. The reagent is of such character that the operative limits of the process cannot be overstepped and accordingly the process can be operated by unskilled labor. The process is furthermore capable of variations which permit its adaptation to the treatment of sulphuric acid pickle liquors of varying concentrations.

Having described my invention, what I claim is:

1. A process for purifying hot spent sulfuric acid pickle liquors, comprising maintaining the pH of the hot spent pickle liquor between the pH value 6.0 and the pH value 7.0 by incorporating in the hot liquor a quantity of a carbonate of an alkaline earth metal in sufficient excess to increase the available neutralizing value from 15% to 20% over that theoretically required to neutralize the entire acid content of the liquor, and agitating the liquor in which said carbonate has been incorporated for a time period adequate to neutralize the entire acid content and bring the pH within range of from pH 6.0 to 7.0 effecting hydrolysis of the ferrous-sulfate contained in the liquor into ferrous hydroxide and sulfuric acid, and rendering the hydrolysis continuous and complete by neutralizing sulfuric acid so formed and oxidizing the ferrous hydroxide resulting from said hydrolysis to ferric hydroxide.

2. A process for purifying hot spent sulfuric acid pickle liquors, comprising maintaining the pH of the hot spent pickle liquor between the pH value 6.0 and the pH value 7.0 by incorporating in the hot liquor a quantity of a carbonate of an alkaline earth metal in sufficient excess to increase the available neutralizing value from 15% to 20% over that theoretically required to neutralize the entire acid content of the liquor, and agitating the liquor in which said carbonate has been incorporated for a time period in excess of one hour to neutralize the entire acid content and bring the pH within range of from pH 6.0 to pH 7.0 effecting hydrolysis of the ferrous-sulfate contained in the liquor into ferrous hydroxide and sulfuric acid, and rendering the hydrolysis continuous and complete by neutralizing sulfuric acid so formed and oxidizing the ferrous hydroxide resulting from said hydrolysis to ferric hydroxide by passing air through the solution while the same is maintained at a temperature of the order of 100° C.

3. A process for purifying hot spent sulfuric acid pickle liquors, comprising maintaining the pH of the hot spent pickle liquor between the pH value 6.0 and the pH value 7.0 by incorporating in the hot liquor a quantity of a carbonate of an alkaline earth metal in sufficient excess to increase the available neutralizing value from 15% to 20% over that theoretically required to neutralize the entire acid content of the liquor, and agitating the liquor in which said carbonate has been incorporated for a time period in excess of one hour to neutralize the entire acid content and bring the pH within range of from pH 6.0 to pH 7.0 effecting hydrolysis of the ferrous-sulfate contained in the liquor into ferrous hydroxide and sulfuric acid, and rendering the hydrolysis continuous and complete by neutralizing sulfuric acid so formed and oxidizing the ferrous hydroxide resulting from said hydrolysis to ferric hydroxide by passing air through the solution while the same is maintained under a substantial superatmospheric pressure.

4. A process for purifying hot spent sulfuric acid pickle liquors, comprising maintaining the pH of the hot spent pickle liquor between the pH value 6.0 and the pH value 7.0 by incorporating in the hot liquor a quantity of a carbonate of an alkaline earth metal in sufficient excess to increase the vailable neutralizing value from 15% to 20% over that theoretically required to neutralize the entire acid content of the liquor, and agitating the liquor in which said carbonate has been incorporated for a time period in excess of one hour to neutralize the entire acid content and bring the pH within range of from pH 6.0 to pH 7.0 effecting hydrolysis of the ferrous-sulfate contained in the liquor into ferrous hydroxide and sulfuric acid, and rendering the hydrolysis continuous and complete by neutralizing sulfuric acid so formed and oxidizing the ferrous hydroxide resulting from said hydrolysis to ferric hydroxide by passing air through the solution while the same is maintained at a temperature of the order of 100° C. and under a substantial superatmospheric pressure.

JOHN T. TRAVERS.